(12) United States Patent
Ichikawa (10) Patent No.: US 11,788,580 B2
(45) Date of Patent: Oct. 17, 2023

(54) ROLLING BEARING

(71) Applicant: NSK LTD., Tokyo (JP)

(72) Inventor: Tomoya Ichikawa, Fujisawa (JP)

(73) Assignee: NSK LTD., Tokyo (JP)

( * ) Notice: Subject to any disclaimer, the term of this patent is extended or adjusted under 35 U.S.C. 154(b) by 204 days.

(21) Appl. No.: 17/430,559

(22) PCT Filed: Feb. 14, 2020

(86) PCT No.: PCT/JP2020/005699
§ 371 (c)(1),
(2) Date: Aug. 12, 2021

(87) PCT Pub. No.: WO2020/166686
PCT Pub. Date: Aug. 20, 2020

(65) Prior Publication Data
US 2022/0128093 A1 Apr. 28, 2022

(30) Foreign Application Priority Data
Feb. 14, 2019 (JP) ................................. 2019-024426

(51) Int. Cl.
*F16C 19/06* (2006.01)
*F16C 33/78* (2006.01)
*F16C 33/80* (2006.01)

(52) U.S. Cl.
CPC .......... *F16C 33/7823* (2013.01); *F16C 19/06* (2013.01); *F16C 33/80* (2013.01)

(58) Field of Classification Search
CPC .. F16C 19/06; F16C 33/7823; F16C 33/7853; F16C 33/80
See application file for complete search history.

(56) References Cited

U.S. PATENT DOCUMENTS

| 4,830,518 A * | 5/1989 | Shiratani | ................. F16C 19/26 277/411 |
| 6,692,393 B2 * | 2/2004 | Fukuwaka | .......... F16C 33/7853 474/135 |

(Continued)

FOREIGN PATENT DOCUMENTS

| CN | 2908904 Y * | 6/2007 | .......... F16C 33/7806 |
| CN | 104271973 A | 1/2015 | |

(Continued)

OTHER PUBLICATIONS

Communication dated Oct. 27, 2022 by the State Intellectual Property Office of People's Republic of China for Chinese Patent Application No. 202080024206.1.

(Continued)

*Primary Examiner* — Phillip A Johnson
(74) *Attorney, Agent, or Firm* — Sughrue Mion, PLLC (57) ABSTRACT

In an outer ring rotating rolling bearing, an inclined surface is formed on an outer peripheral surface of an inner ring and decreasing in diameter toward an axially outer side, a seal member includes an annular core metal and an annular elastic member fixed to the core metal, and an elastic member includes a neck portion extending from an inner peripheral edge portion of the core metal toward a radially inner side and a seal lip formed at a tip end portion of a neck portion and brought into contact with the inclined surface of the inner ring with a tightening margin. Here, $T2 \geq T1$, where a width of the core metal is T1 and a thickness of the neck portion is T2.

4 Claims, 4 Drawing Sheets

(56) References Cited

U.S. PATENT DOCUMENTS

| | | |
|---|---|---|
| 2006/0153484 A1 | 7/2006 | Ohata et al. |
| 2015/0152920 A1 | 6/2015 | Koda |
| 2015/0247533 A1* | 9/2015 | Fickert-Guenther ........................ F16C 33/805 384/480 |
| 2016/0327096 A1* | 11/2016 | Aupetitgendre ...... F16C 33/783 |
| 2018/0274593 A1 | 9/2018 | Taniguchi |

FOREIGN PATENT DOCUMENTS

| | | | |
|---|---|---|---|
| CN | 106996422 A * | 8/2017 | .............. F16C 33/38 |
| CN | 108662025 A | 10/2018 | |
| DE | 10 2015 220 136 A1 | 4/2017 | |
| JP | 54-56050 U | 4/1979 | |
| JP | 64-20531 U | 2/1989 | |
| JP | 2003-139149 A | 5/2003 | |
| JP | 2003-247556 A | 9/2003 | |
| JP | 2006-38114 A | 2/2006 | |
| JP | 2006336734 A * | 12/2006 | .......... F16C 33/7853 |
| JP | 2007-198151 A | 8/2007 | |
| JP | 2007-315459 A | 12/2007 | |
| JP | 2011-127702 A | 6/2011 | |
| JP | 2012007688 A * | 1/2012 | .......... F16C 33/7853 |
| JP | 2012-202461 A | 10/2012 | |
| JP | 2014-194281 A | 10/2014 | |
| JP | 2015-200393 A | 11/2015 | |
| WO | 2004/007983 A1 | 1/2004 | |

OTHER PUBLICATIONS

International Search Report (PCT/ISA/210) dated Apr. 21, 2020, issued by the International Searching Authority in counterpart International Application No. PCT/JP2020/005699.

Written Opinion (PCT/ISA/237) dated Apr. 21, 2020, issued by the International Searching Authority in counterpart International Application No. PCT/JP2020/005699.

Communication dated Feb. 28, 2022 by the European Patent Office in European Patent Application No. 20756527.6.

\* cited by examiner

ROLLING BEARING

TECHNICAL FIELD

The present invention relates to a rolling bearing, and more specifically, to a rolling bearing for use in an environment where pressure fluctuates due to a rotation or swinging of parts inside a functionally sealed system, such as a rolling bearing for fan coupling, supercharger, decoupler, and clutch pulley.

BACKGROUND ART

In the related art, an application example of a rolling bearing used in a pressure resistant environment can include a fluid fan coupling. The fluid fan coupling is used as a noise countermeasure of the rotation of the fan while the fan is rotated by using the power of the engine to cool the engine with the generated wind (see, for example, Patent Literature 1). At that time, in the rolling bearing, an inner ring is supported by an input shaft directly connected to the engine, and an outer ring is supported by an output shaft connected to the fan. Further, in the rolling bearing, a seal member is generally used to prevent the inflow of oil into the fan coupling and to seal an opening of an annular space inside the bearing.

Further, as a seal member for use in the rolling bearing, for example, it is known that, in a multipoint contact ball bearing for use in automobile pulleys and the like described in Patent Literature 2, a lip portion of the seal member is in contact with the side surface of a seal groove provided on an outer diameter surface of the inner ring.

Further, in a sealed rolling bearing described in Patent Literature 3, it is described that a seal member includes a lip portion including a sliding contact surface that slides into contact with an outer peripheral surface of an inner ring, and dimples are formed on the sliding contact surface of the lip portion, and a carbon film covering the dimples is formed, so that wear of the seal and an increase in torque are unlikely to occur for a long period of time.

CITATION LIST

Patent Literature

[Patent Literature 1] JP-A-2007-198151
[Patent Literature 2] JP-A-2003-247556
[Patent Literature 3] JP-A-2012-202461

SUMMARY OF INVENTION

Technical Problem

Meanwhile, there are bearings for superchargers, decouplers, and clutch pulleys, which are used in the environment similar to the fan coupling bearing described above. In general, the supercharger compresses air by rotating a pair of rotors with irregularities thereon and sends out the air, and the decoupler and the clutch pulley mainly include, as a structure to absorb rotation fluctuations of the crank, a clutch mechanism that uses springs and rollers and a rolling bearing that rotatably supports the rotor and the pulley on a rotating shaft. Therefore, the former rolling bearing is used under the condition that the inner ring is rotated and the outer ring is fixed to the housing, and the latter rolling bearing is used under the condition that the outer ring is rotated and the inner ring is rotated and swung in synchronization with the outer ring, and a seal member is used to seal the opening of the annular space inside the bearing.

Further, since the fan coupling, the supercharger, the decoupler, and the clutch pulley have the pressure fluctuations inside the annular space due to the internal structure thereof, the seal member is subjected to external pressure (pressure fluctuation) from oil, grease, air, or the like inside the pulley.

In particular, concerning the rolling bearings for use in the decouplers and clutch pulleys, since the outer ring is rotated at high speed (10000 rpm or more), when the seal lip described in Patent Literature 2 and Patent Literature 3 is applied, there is a possibility that the seal lip will be deformed to the outer diameter side under the influence of centrifugal force, and sufficient sealing performance cannot be ensured.

The present invention has been made in view of the problems described above, and an object thereof is to provide a rolling bearing capable of suppressing the influence of centrifugal force generated on the seal lip and ensuring the sealing performance of the seal member even in an environment where the outer ring is rotated at high speed and the seal member is subjected to external pressure (pressure fluctuation).

Solution to Problem

The objects of the present invention described above are achieved by any of the following configurations.

(1) An outer ring rotating rolling bearing, including:
  an outer ring including an outer ring raceway surface formed on an inner peripheral surface;
  an inner ring including an inner ring raceway surface formed on an outer peripheral surface;
  a plurality of rolling bodies rotatably arranged between the outer ring raceway surface and the inner ring raceway surface; and
  at least one seat member attached to the outer ring and sealing an axial opening between the outer ring and the inner ring, in which,
  on the outer peripheral surface of the inner ring, there is formed an inclined surface decreasing in diameter toward an axially outer side,
  the seal member includes an annular core metal and an annular elastic member fixed to the core metal,
  the elastic member includes a seal lip including a neck portion extending from an inner peripheral edge portion of the core metal toward a radially inner side, and a sliding contact portion formed at a tip end portion of the neck portion and sliding into an inclined surface of the inner ring with a tightening margin, and
  $T2 \geq T1$, where a width of the core metal is T1 and a thickness of the neck portion is T2.

According to this configuration, the sliding contact portion of the seal lip slides on the inclined surface of the inner ring with a tightening margin, so that it is possible to suppress the influence of centrifugal force generated on the seal lip even in an environment where the outer ring is rotated at high speed and the seal member is subjected to external pressure (pressure fluctuation). Further, by increasing the thickness T2 of the neck portion, the rigidity of the seal lip can be ensured, so that it is possible to improve the sealing performance of the seal member when the seal lip is elastically deformed under the environment described above.

(2) The rolling bearing according to (1) described above, in which the elastic member further includes a grease lip extending from the inner peripheral edge portion of the core metal toward an axially inner side, on the outer peripheral surface of the inner ring, there is formed a stepped portion on the axially inner side, which is continuous with the inclined surface and forming a labyrinth gap between the stepped portion and the grease lip, and in a state before being assembled into the rolling bearing, a radial length L of the seal lip is W2≤L≤W3, where an axial length from an axial end surface of the inner ring to a boundary portion between the inclined surface and the stepped portion is W2, and an axial length from the axial end surface of the inner ring to a side wall surface of the stepped portion is W3.

According to this configuration, by increasing the reaction force when the seal lip is elastically deformed, it is possible to further improve the sealing performance of the seal member and to stabilize the behavior of the seal lip.

(3) The rolling bearing according to (1) or (2) described above, in which the elastic member further includes a grease lip extending from the inner peripheral edge portion of the core metal toward an axially inner side, on the outer peripheral surface of the inner ring, there is formed a stepped portion on the axially inner side, which is continuous with the inclined surface and forming a labyrinth gap between itself and the grease lip, and an inner diameter D1 of the inner peripheral edge portion of the core metal is less than a maximum diameter D2 of the outer peripheral surface of the inner ring and greater than an outer diameter D3 of the cylindrical surface of the stepped portion.

According to this configuration, the configuration can have a grease lip, and the inner peripheral edge portion of the core metal can be formed along toward the radially inner side, and even in an environment where the seal member is subjected to external pressure (pressure fluctuation), it is possible to suppress the deformation of the seal member.

(4) The rolling bearing according to any one of (1) to (3) described above, in which, in an assembled state in the rolling bearing, the tip end portion of the seal lip is positioned farther to an axially inner side than an axially outer surface of the seal member.

According to this configuration, even when the sliding contact portion of the seal lip is brought into sliding contact with the inclined surface of the inner ring with an increased tightening margin, it is possible to prevent the seal member from interfering with the mating part, and it is possible to improve the sealing performance of the seal member.

(5) An outer ring rotating rolling bearing, including:
an outer ring including an outer ring raceway surface formed on an inner peripheral surface;
an inner ring including an inner ring raceway surface formed on an outer peripheral surface;
a plurality of rolling bodies rotatably arranged between the outer ring raceway surface and the inner ring raceway surface; and
at least one seal member attached to the outer ring and sealing an axial opening between the outer ring and the inner ring, in which,
on the outer peripheral surface of the inner ring, there are formed an inclined surface decreasing in diameter toward an axially outer side, and a stepped portion on an axially inner side, which is continuous with the inclined surface,
the seal member includes an annular core metal and an annular elastic member fixed to the core metal,
the elastic member includes a seal lip including a neck portion extending toward a radially inner side from an inner peripheral edge portion of the core metal, and a sliding contact portion formed at a tip end portion of the neck portion and sliding into an inclined surface of the inner ring with a tightening margin, and a grease lip extending from the inner peripheral edge portion of the core metal toward the axially inner side and forming a labyrinth gap between itself and the stepped portion, and in a state before being assembled into the rolling bearing, a radial length L of the seal lip is W2≤L≤W3, where an axial length from an axial end surface of the inner ring to a boundary portion between the inclined surface and the stepped portion is W2, and an axial length from the axial end surface of the inner ring to a side wall surface of the stepped portion is W3.

According to this configuration, the sliding contact portion of the seal lip slides on the inclined surface of the inner ring with a tightening margin, so that it is possible to suppress the influence of centrifugal force generated on the seal lip even in an environment where the outer ring is rotated at high speed and the seal member is subjected to external pressure (pressure fluctuation). Further, by defining the radial length L of the seal lip to fall within the range described above, it is possible to stabilize the behavior of the seal lip while improving the sealing performance of the seal member by increasing the reaction force when the seal lip is elastically deformed.

(6) An outer ring rotating rolling bearing, including:
an outer ring including an outer ring raceway surface formed on an inner peripheral surface;
an inner ring including an inner ring raceway surface formed on an outer peripheral surface;
a plurality of rolling bodies rotatably arranged between the outer ring raceway surface and the inner ring raceway surface; and
at least one seal member attached to the outer ring and sealing an axial opening between the outer ring and the inner ring, in which,
on the outer peripheral surface of the inner ring, there are formed an inclined surface decreasing in diameter toward an axially outer side, and a stepped portion on an axially inner side, which is continuous with the inclined surface,
the seal member includes an annular core metal and an annular elastic member fixed to the core metal,
the elastic member includes a seal lip including a neck portion extending toward a radially inner side from an inner peripheral edge portion of the core metal, and a sliding contact portion formed at a tip end portion of the neck portion and sliding into an inclined surface of the inner ring with a tightening margin, and a grease lip extending from the inner peripheral edge portion of the core metal toward the axially inner side and forming a labyrinth gap between itself and the stepped portion, and
an inner diameter D1 of the inner peripheral edge portion of the core metal is less than a maximum diameter D2 of the outer peripheral surface of the inner ring and greater than an outer diameter D3 of the cylindrical surface of the stepped portion.

According to this configuration, the sliding contact portion of the seal lip slides on the inclined surface of the inner ring with a tightening margin, so that it is possible to suppress the influence of centrifugal force generated on the seal lip even in an environment where the outer ring is rotated at high speed and the seal member is subjected to external pressure (pressure fluctuation). Further, the configuration can have a grease lip, and the inner peripheral edge portion of the core metal can be formed along toward the radially inner side, and even in an environment where the seal member is subjected to external pressure (pressure fluctuation), it is possible to suppress the deformation of the seal member.

Advantageous Effects of Invention

According to the rolling bearing of the present invention, even in an environment where the outer ring is rotated at high speed and the seal member is subjected to external pressure (pressure fluctuation), the influence of centrifugal force generated on the seal lip can be suppressed, and the sealing performance of the seal member can be ensured.

DESCRIPTION OF EMBODIMENTS

Hereinafter, a rolling bearing according to an embodiment of the present invention will be described in detail with reference to the drawings.

Figure 1:
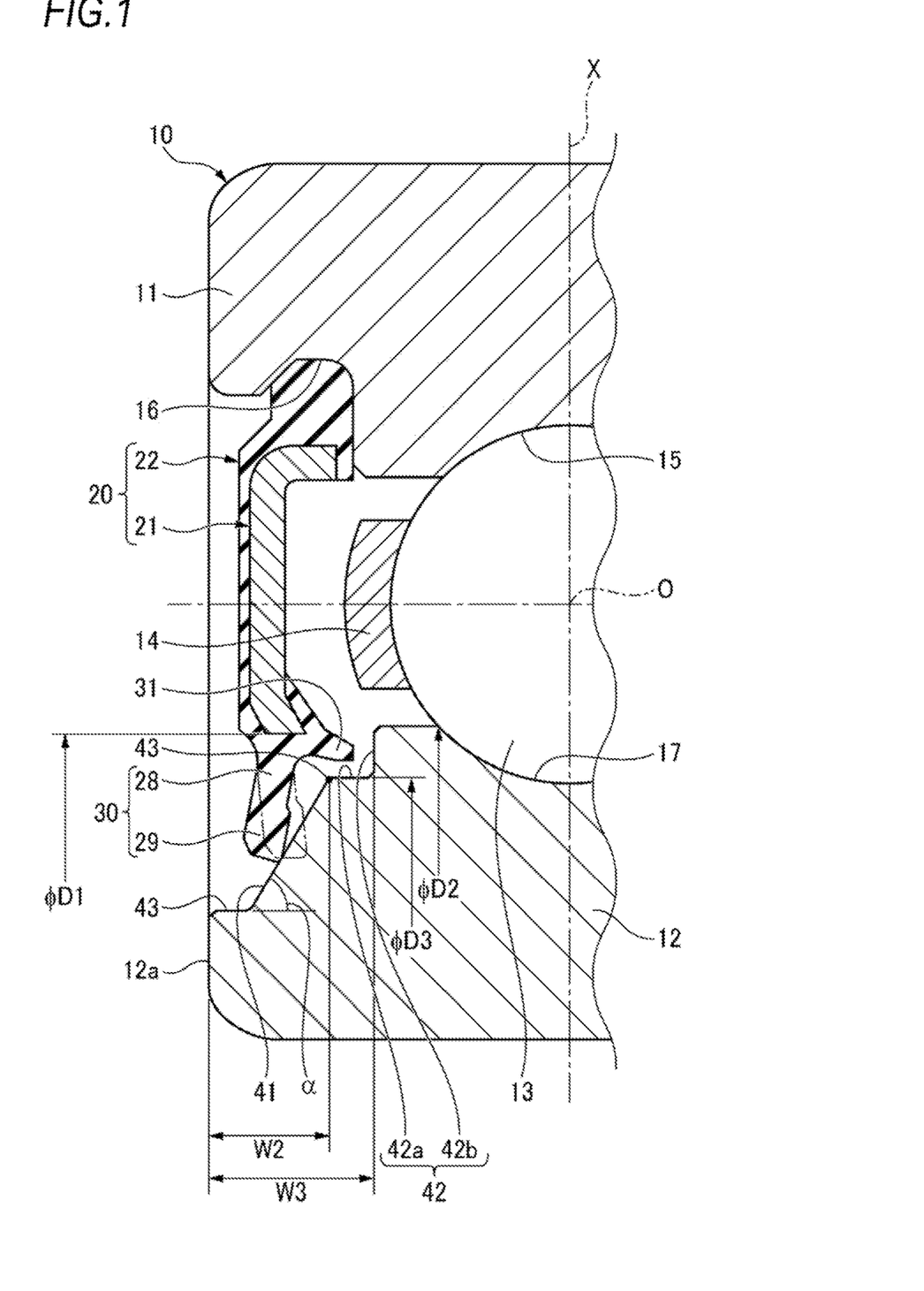
FIG. 1 is a vertical cross-sectional view illustrating a main part of a rolling bearing.

As illustrated in FIG. 1, a rolling bearing 10 for a decoupler (hereinafter, simply referred to as "rolling bearing 10") of the present embodiment includes an outer ring 11 internally fitted in a pulley (not illustrated), an inner ring 12 externally fitted on a rotating shaft (not illustrated), a plurality of balls 13 which are rolling bodies, a cage 14 that rotatably holds the plurality of balls 13, and a pair of seal members 20 (only one of these is illustrated in the drawing). Further, the rolling bearing 10 is used under the condition that the outer ring 11 is rotated and the inner ring 12 is rotated and swung in synchronization with the outer ring 11, and the seal member 20 is in such an environment that it is subjected to external pressure (pressure fluctuation) due to oil, grease, air, and the like. In addition, since the rolling bearing 10 of the present embodiment is configured in line symmetry with respect to a radial line X passing through a center O of the ball 13, FIG. 1 illustrates only the left half.

An outer ring raceway surface 15 of concave shape is formed on an inner peripheral surface of the outer ring 11, and an inner ring raceway surface 17 of concave shape is formed on an outer peripheral surface of the inner ring 12.

A plurality of balls 13, which are arranged at equal intervals in a circumferential direction by the cage 14, are rotatably arranged between the outer ring raceway surface 15 and the inner ring raceway surface 17. Between the outer ring 11 and the inner ring 12, the seal member 20, which is attached to a seal locking groove 16 formed on an axially outer side of the outer ring 11, is arranged on an axially outer side, and seals an axial opening between the outer ring 11 and the inner ring 12.

The seal member 20 prevents the grease (not shown) sealed in the rolling bearing 10 from leaking outside, and also prevents foreign matter (e.g., oil, grease, water, and the like) outside the rolling bearing 10 from entering inside.

Figure 2:
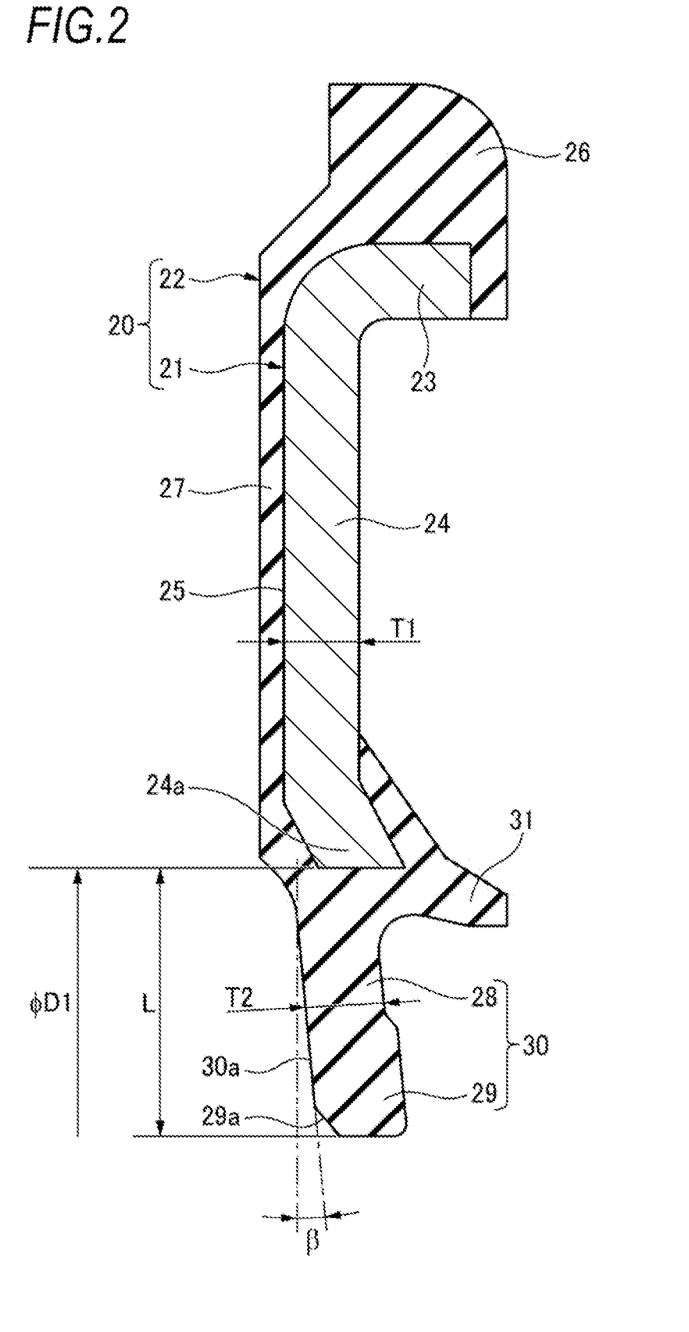
FIG. 2 is an enlarged cross-sectional view illustrating the seal member illustrated in FIG. 1 in a free state.

Referring to FIG. 2, the seal member 20 includes an annular core metal 21 formed of a metal plate such as a steel plate and having a substantially L-shaped cross section, and an annular elastic member 22 formed of an elastic material such as rubber and the like and fixed to the core metal 21.

The core metal 21 includes a cylindrical portion 23, and a disk portion 24 bent from one axial end of the cylindrical portion 23 to a radially inner side. An inner peripheral edge portion 24a of the disk portion 24 is bent so as to be inclined to an axially inner side.

The elastic member 22 includes an outer peripheral edge portion 26 formed by covering an outer peripheral surface of the cylindrical portion 23 of the core metal 21 and bulging on a radially outer side, a side portion 27 fixed to an outer surface 25 of the core metal 21, a contact type seal lip 30 including an annular neck portion 28 continuous with the side portion 27 and extending from the inner peripheral edge portion 24a of the core metal 21 toward the radially inner side, and a sliding contact portion 29 continuously formed at a tip end portion of the neck portion 28, and a non-contact type grease lip 31 extending from the inner peripheral edge portion 24a of the core metal 21 toward the axially inner side.

The outer peripheral edge portion 26 of the elastic member 22 is locked in the seal locking groove 16 formed at an axial end portion of the outer ring 11 by press fitting or the like, and the seal member 20 is fixed to the outer ring 11.

Further, the seal lip 30 is brought into contact with an inclined surface 41 formed on the outer peripheral surface of the inner ring 12 with a tightening margin, the grease lip 31 is arranged close to and facing a stepped portion 42 formed on the outer peripheral surface of the inner ring 12, and a labyrinth gap is formed between the grease lip 31 and the stepped portion 42.

Therefore, on an outer peripheral surface of a shoulder portion of the inner ring 12 on the axially outer side with respect to the inner ring raceway surface 17, there are formed the inclined surface 41 decreasing in diameter toward the axially outer side, and the stepped portion 42 on the axially inner side, which is continuous with the inclined surface 41 and formed of a cylindrical surface 42a and a side wall surface 42b. Further, on the outer peripheral surface of the shoulder portion, another cylindrical surface 44 having a smaller diameter is formed between an axial end surface 12a of the inner ring 12 and the inclined surface 41. For example, the angle α of the inclined surface 41 is set to 55 to 70° with respect to the axial direction. By setting the angle α to the relevant range, the rolling bearing can, in combination with the seal lip shape described below, bring the seal lip 30 into contact with the inclined surface 41 with an appropriate tightening margin without significantly extending the axial length of the shoulder portion of the inner ring 12, and it is possible to improve the sealing property at the time of high speed rotation of 10000 rpm or more described above.

Further, as illustrated in FIG. 2, in a state before being assembled into the rolling bearing 10, the seal lip 30 has a shape such that it is slightly inclined toward the axially inner side as it gets close to the radially inner side. As a result, as the seal lip 30 is assembled in the rolling bearing 10 and brought into contact with the inclined surface 41 with a tightening margin, the seal lip 30 is shaped substantially according to the radially inner side (in this embodiment, as is evident from FIG. 1, the seal lip 30 is slightly inclined toward the axially outer side as it gets close to the radially inner side, and in the assembled state in the rolling bearing, the direction of an axially outer surface 30a of the seal lip 30 is changed). Specifically, the angle β of the axially outer surface 30a of the seal lip 30 before being assembled into the rolling bearing 10 is preferably set to 8° or less with respect to the radial direction so as to be elastically deformed by a contact with the inclined surface 41 and have the shape described above while giving an appropriate tightening margin.

In this example, in the rolling bearing 10 of the present embodiment, since the outer ring 11 is rotated at high speed, the seal lip 30 is likely to be affected by centrifugal force. However, since the sliding contact portion 29 of the seal lip 30 is brought into contact with the inclined surface 41 of the inner ring 12 and the seal lip 30 is shaped to face substantially the radially inner side, the influence of the centrifugal force generated on the seal lip 30 can be suppressed.

Further, when the outer ring 11 is rotated at high speed, since the grease lip 31 tends to elastically deform toward the radially outer side due to the centrifugal force, this deformation also acts on the seal lip 30 to urge the seal lip 30 toward the axially inner side, thereby further suppressing the influence of the centrifugal force generated on the seal lip 30.

In addition, in the present embodiment, T2≥T1 is set when the width in the axial direction at the central portion of the core metal 21 is T1 and the thickness of the neck portion 28 is T2. That is, since the thickness T2 of the neck portion 28 is increased, the rigidity of the seal lip 30 can be ensured, and while the seal lip 30 has a tendency to be elastically deformed, it is hardly deformed, and the sealing performance can be improved. Note that the thickness T2 of the neck portion 28 represents the minimum thickness of the neck portion 28.

Further, since the rolling bearing of the present embodiment is supposed to be used in an environment where it is subjected to external pressure or internal pressure, with T2≥T1, the pressure resistance performance of the seal lip 30 against external pressure or internal pressure can be improved, thereby suppressing deformation of the seal lip 30, and ensuring the rigidity of the seal lip 30.

Further, in the state before being assembled into the rolling bearing 10, a radial length L of the seal lip 30 from the inner peripheral edge portion 24a of the core metal 21 to the inner peripheral surface of the sliding contact portion 29 is preferably short in order to elastically deform the seal lip 30 and increase the reaction force, while it is preferably long in order to stabilize the behavior of the seal lip 30. Therefore, in order to satisfy both of the characteristics described above, the radial length L of the seal lip 30 is set to W2≤L≤W3, where the axial length from the axial end surface 12a of the inner ring 12 to a boundary portion 43 between the inclined surface 41 and the stepped portion 42 is W2, and the axial length from the axial end surface 12a of the inner ring 12 to the side wall surface 42b of the stepped portion 42 is W3.

Further, the inner diameter D1 of the inner peripheral edge portion of the core metal 21 is designed to be smaller than the maximum diameter D2 of the outer peripheral surface of the inner ring 12 and is designed to be larger than the outer diameter D3 of the cylindrical surface 42a of the stepped portion 42. As a result, the configuration can have the grease lip 31, the inner peripheral edge portion 24a of the core metal 21 can be formed along toward the radially inner side, and in an environment that is subjected to external pressure or internal pressure, the pressure resistance performance of the seal member 20 is enhanced, and deformation of the seal lip 30 can also be suppressed.

Further, in the assembled state in the rolling bearing 10, the tip end portion of the seal lip 30 is positioned farther to the axially inner side than the axially outer surface of the seal member 20, that is, than the axial side surface of the side portion 27. It is desirable to increase the tightening margin of the seal lip 30 in order to improve the sealing performance, but if the tightening margin is too large, the seal lip 30 is greatly deformed when the seal member 20 is assembled into the rolling bearing 10. In some cases, there is a possibility that the seal lip 30 protrudes out of the axial end surface of the rolling bearing 10 and interfere with the mating component to deteriorate the sealing function or break the seal. Therefore, in the present embodiment, a chamfered portion 29a is formed at a corner between the inner peripheral surface and the axial side surface of the seal lip 30, so that the tip end portion of the seal lip 30 is positioned farther to the axially inner side than the axially outer surface of the seal member 20.

Therefore, according to the outer ring rotating rolling bearing 10 of the present embodiment, even in the environment where the outer ring is rotated at high speed and the seal member 20 is subjected to external pressure or internal pressure, the influence of the centrifugal force generated on the seal lip 30 can be suppressed, and the sealing performance of the seal member 20 can be ensured. Further, the seal lip 30 is formed to be linear as much as possible along the radial direction, and the influence of centrifugal force can be minimized.

Note that the present invention is not limited to the embodiments described above, but may encompass modifications or improvements, as appropriate.

For example, in the embodiment described above, the seal member 20 is attached to the outer ring 11 by locking the outer peripheral edge portion 26 of the elastic member 22 that covers the outer peripheral surface of the cylindrical portion 23 of the core metal 21 in the seal locking groove 16 of the outer ring 11, but the present invention is not limited thereto.

Figure 3:
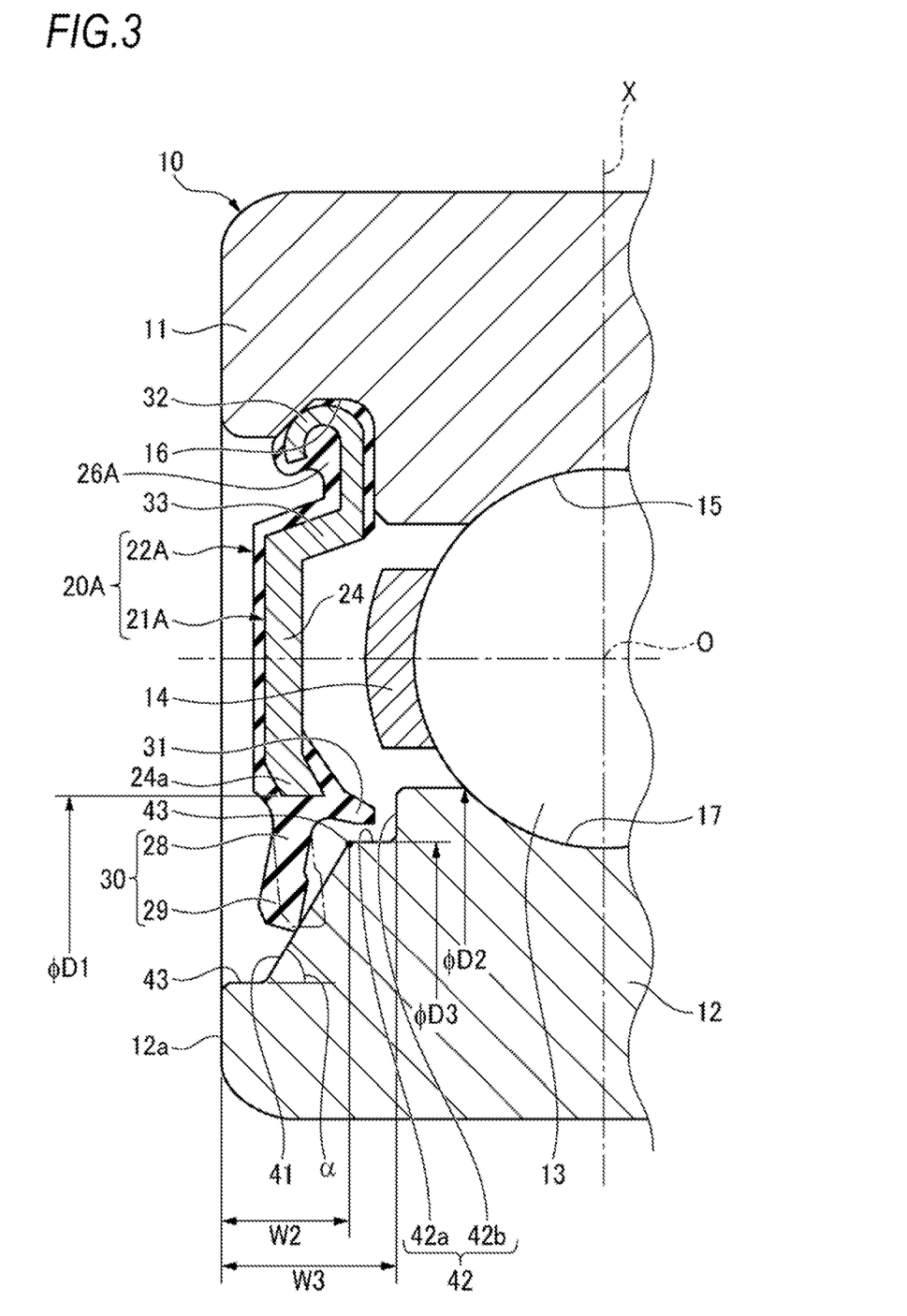
FIG. 3 is a vertical cross-sectional view illustrating a main part of a rolling bearing including a seal member according to a first modification of the present invention.

In a seal member 20A of the first modification illustrated in FIG. 3, instead of the cylindrical portion 23 of the embodiment described above, a core metal 21A includes a curl portion 32 for crimping and fixing the seal member 20A to the seal locking groove 16, and an inner diameter side of the curl portion 32 and an outer diameter side of the disk portion 24 are connected to each other by a connecting portion 33 extending in the axial direction. Further, an outer peripheral edge portion 26A of an elastic member 22A is formed so as to cover the curl portion 32 from the axially outer side to the axially inner side of the curl portion 32.

In this case, by crimping and fixing of the curl portion 32, the fitting force of the seal member 20 to the outer ring 11 can be enhanced, and for example, even when the reaction force on the seal lip 30 increases and the sliding resistance of the seal member 20 increases, the relative rotation between the seal member 20 and the outer ring 11 can be prevented.

Figure 4:
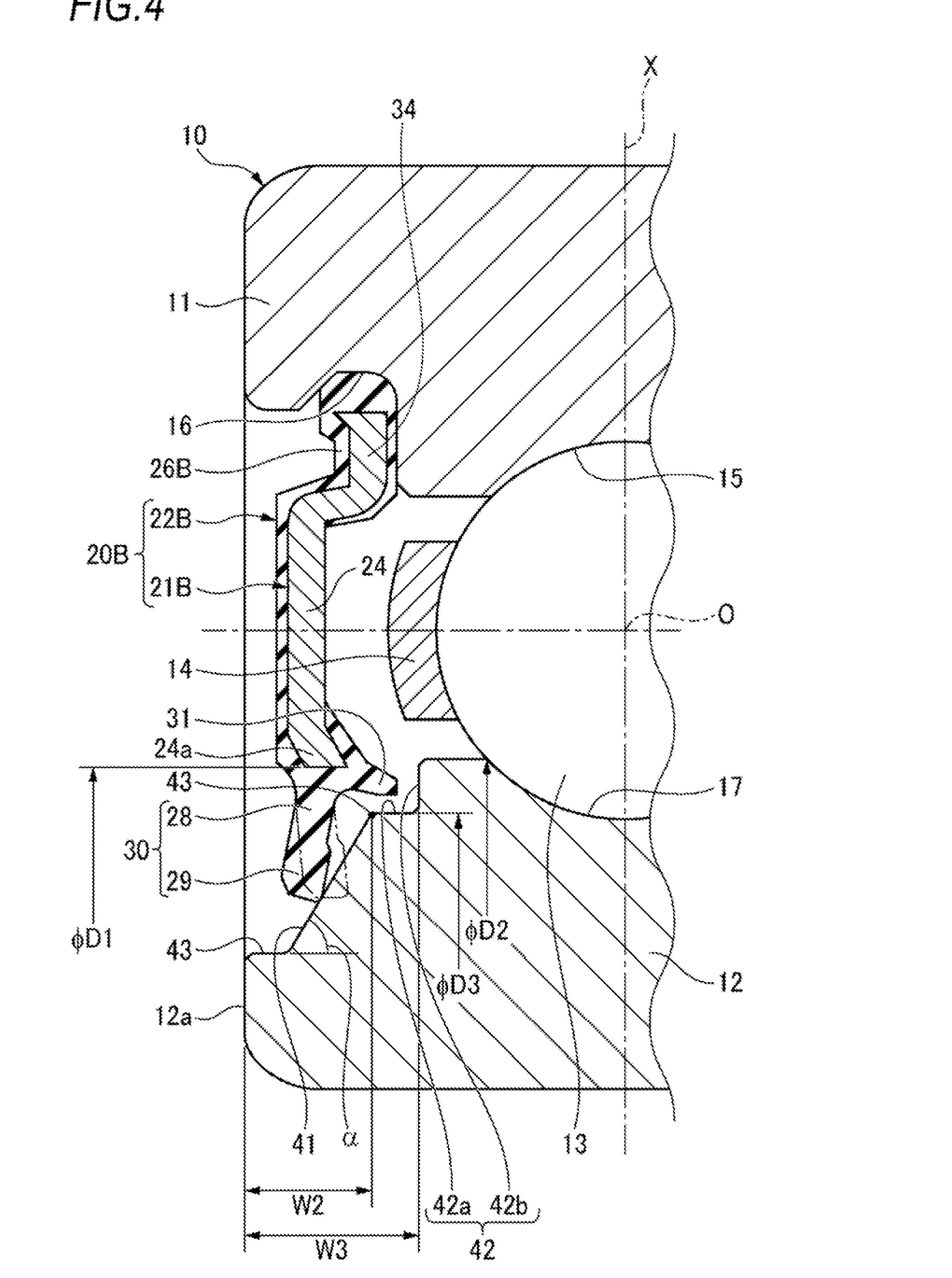
FIG. 4 is a vertical cross-sectional view illustrating a main part of a rolling bearing including a seal member according to a second modification of the present invention.

Moreover, in a seal member 20B of the second modification illustrated in FIG. 4, instead of the cylindrical portion 23 of the embodiment described above, a core metal 21B includes a crank-shaped portion 34 that is bent from the outer diameter side of the disk portion 24 toward the axially inner side and then further bent toward the radially outer side. Further, an outer peripheral edge portion 26B of an elastic member 22B is formed so as to cover the crank-shaped portion 34 from the axially outer side to the axially inner side of the crank-shaped portion 34.

In this case, since a portion of the core metal 21 is entered into the outer peripheral edge portion 26B by the crank-shaped portion 34, the fitting force of the seal member 20 to the outer ring 11 can be improved, and for example, even when the reaction force on the seal lip 30 increases and the sliding resistance of the seal member 20 increases, the relative rotation between the seal member 20 and the outer ring 11 can be prevented.

Further, the rolling bearing of the present invention may have a configuration in which the outer ring is rotated, and for the inner ring, it may be rotated and swung in synchronization with the outer ring as described in the present embodiment, although it may be configured to be fixed.

Further, the rolling bearing of the present invention is not limited to the deep groove ball bearing of the above embodiment, and may be applied to other types of rolling bearings.

This application is based upon Japanese Patent Application (Application No. 2019-024426), filed on Feb. 14, 2019, the entire contents of which are incorporated herein by reference.

REFERENCE SIGNS LIST

10: rolling bearing
11: outer ring
12: inner ring
13: ball (rolling body)
14: cage
15: outer ring raceway surface
17: inner ring raceway surface
20: seal member
21: core metal
22: elastic member
24a: inner peripheral edge portion of disk portion (inner peripheral edge portion of core metal)
28: neck portion
29: sliding contact portion
30: seal lip
31: grease lip
41: inclined surface
42: stepped portion
L: length of seal lip in a radial direction
D1: inner diameter of inner peripheral edge portion of core metal
D2: maximum diameter of outer peripheral surface of inner ring
D3: outer diameter of cylindrical surface of stepped portion
T1: width of core metal
T2L: thickness of neck portion
W2: axial length from axial end surface of inner ring to boundary portion between inclined surface and stepped portion
W3: axial length from axial end surface of inner ring to side wall surface of stepped portion

The invention claimed is:

1. An outer ring rotating rolling bearing, comprising:
an outer ring including an outer ring raceway surface formed on an inner peripheral surface;
an inner ring including an inner ring raceway surface formed on an outer peripheral surface;
a plurality of rolling bodies rotatably arranged between the outer ring raceway surface and the inner ring raceway surface; and
at least one seal member attached to the outer ring and sealing an axial opening between the outer ring and the inner ring, wherein,
on the outer peripheral surface of the inner ring, there is formed an inclined surface decreasing in diameter toward an axially outer side,
the seal member includes an annular core metal and an annular elastic member fixed to the core metal,
the elastic member includes a seal lip including a neck portion extending from an inner peripheral edge portion of the core metal toward a radially inner side, and a sliding contact portion formed at a tip end portion of the neck portion and sliding into the inclined surface of the inner ring,
$T2 \geq T1$, where a width of the core metal is T1 and a thickness of the neck portion is T2,
the elastic member further includes a grease lip extending from the inner peripheral edge portion of the core metal toward an axially inner side,
on the outer peripheral surface of the inner ring, there is formed a stepped portion on the axially inner side, which is continuous with the inclined surface and forming a labyrinth gap between itself and the grease lip, and
in a state before being assembled into the rolling bearing, a radial length L of the seal lip is $W2 \leq L \leq W3$, where an axial length from an axial end surface of the inner ring to a boundary portion between the inclined surface and the stepped portion is W2, and an axial length from the axial end surface of the inner ring to a side wall surface of the stepped portion is W3.

2. The rolling bearing according to claim 1, wherein the elastic member further includes a grease lip extending from the inner peripheral edge portion of the core metal toward an axially inner side,
on the outer peripheral surface of the inner ring, there is formed a stepped portion on the axially inner side, the stepped surface is continuous with the inclined surface and forms a labyrinth gap with the grease lip, and
an inner diameter D1 of the inner peripheral edge portion of the core metal is less than a maximum diameter D2 of the outer peripheral surface of the inner ring and greater than an outer diameter D3 of the cylindrical surface of the stepped portion.

3. The rolling bearing according to claim 1, wherein, in an assembled state in the rolling bearing, the tip end portion of the seal lip is positioned farther to an axially inner side than an axially outer surface of the seal member.

4. An outer ring rotating rolling bearing, comprising:
an outer ring including an outer ring raceway surface formed on an inner peripheral surface;
an inner ring including an inner ring raceway surface formed on an outer peripheral surface;
a plurality of rolling bodies rotatably arranged between the outer ring raceway surface and the inner ring raceway surface; and
at least one seal member attached to the outer ring and sealing an axial opening between the outer ring and the inner ring, wherein
on the outer peripheral surface of the inner ring, there are formed an inclined surface decreasing in diameter toward an axially outer side, and a stepped portion on an axially inner side, which is continuous with the inclined surface,
the seal member includes an annular core metal and an annular elastic member fixed to the core metal, the elastic member includes a seal lip including a neck portion extending toward a radially inner side from an inner peripheral edge portion of the core metal, and a sliding contact portion formed at a tip end portion of the neck portion and sliding into inclined surface of the inner ring, and a grease lip extending from the inner peripheral edge portion of the core metal toward the axially inner side and forming a labyrinth gap between itself and the stepped portion, and an inner diameter $D1$ of the inner peripheral edge portion of the core metal is less than a maximum diameter $D2$ of the outer peripheral surface of the inner ring and greater than an outer diameter $D3$ of the cylindrical surface of the stepped portion.

\* \* \* \* \*